Patented Feb. 21, 1933

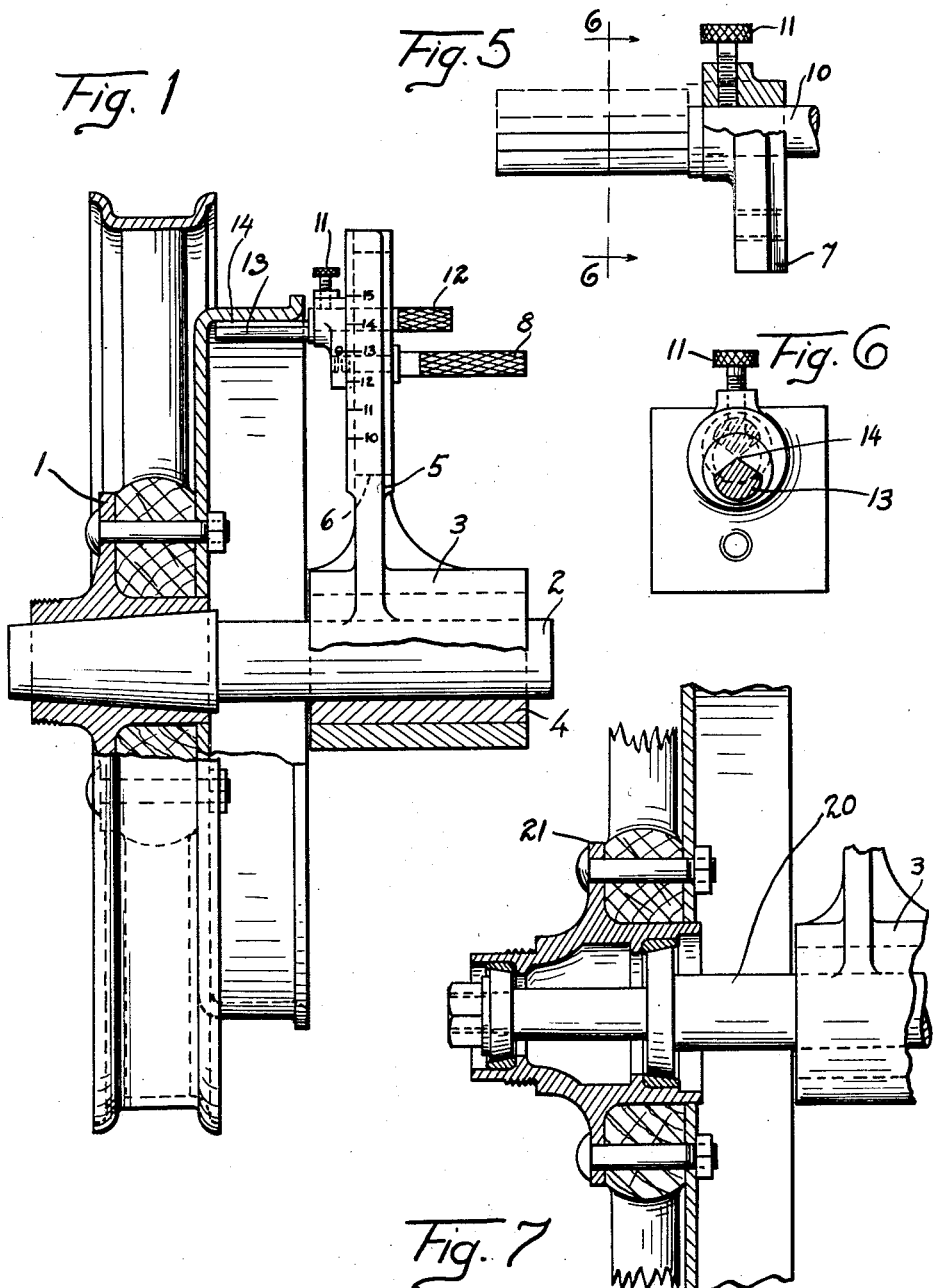

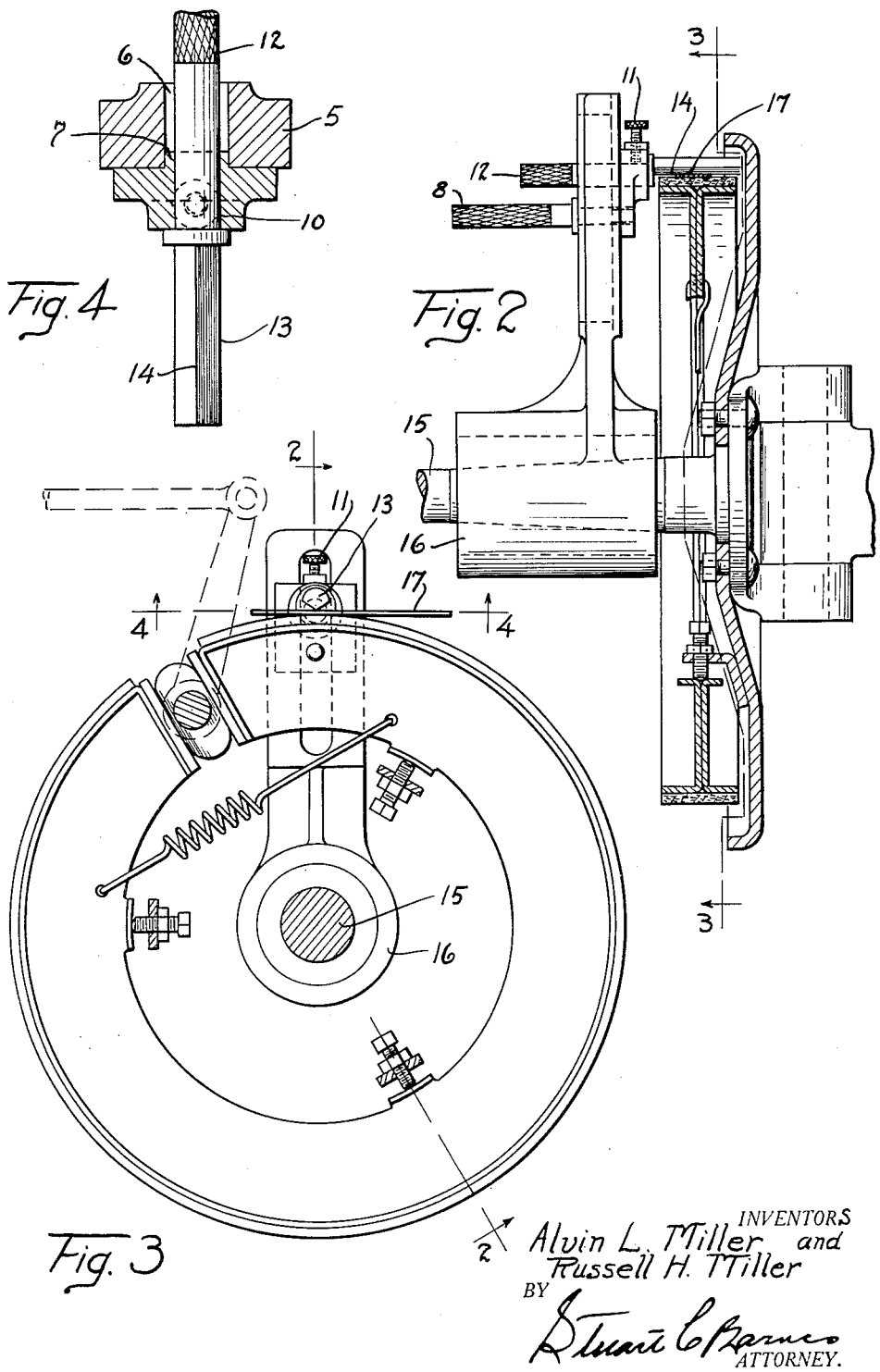

1,898,136

UNITED STATES PATENT OFFICE

ALVIN L. MILLER AND RUSSELL H. MILLER, OF DETROIT, MICHIGAN

BRAKE ADJUSTING TOOL

Application filed April 29, 1929. Serial No. 358,919.

This invention relates to a brake adjusting tool especially adapted for use in adjusting brakes of automotive vehicles. The present invention represents an improved construction over that shown in co-pending application No. 300,168, filed August 17, 1928.

The present invention aims to provide a tool which can be used for gauging both the brake drum and the brake lining, and in this regard a gauging element is provided which is movable to different positions for the gauging of the drum and the brake lining, while at the same time, this element has a gauging face which remains constant during such change. In other words, in the gauging of an internal expanding brake, the drum must be gauged relative to its interior surface, while the lining must be gauged relative to its exterior surface. The movable element above referred to is used for gauging both and it is arranged so that its gauging face remains constant when it is moved from the position for gauging the brake drum to the position for gauging the lining.

The invention will be better understood by reference to the accompanying drawings wherein:

Fig. 1 is a sectional view taken through the rear wheel of an automotive vehicle illustrating the gauge tool in position for gauging the interior surface of a drum of an externally expanding brake.

Fig. 2 is a sectional view in illustration of the gauge device in position to gauge the lining of an internal expanding brake.

Fig. 3 is a view taken on line 3—3 of Fig. 2 showing the tool as used for the adjustment of brake lining.

Fig. 4 is a sectional view taken on line 4—4 of Fig. 3 showing certain details of construction of the adjustable gauge element.

Fig. 5 is another view of the gauge element with some of the parts in section.

Fig. 6 is a section taken on line 6—6 of Fig. 5.

Fig. 7 illustrates a form of arbor which may be used for the mounting of the gauge device.

The brake drums and brake lining of automotive vehicles must be carefully gauged relative to each other at the time of original assembly, in the manufacturing plant or assembly plant, and at times when the brakes and brake linings are adjusted or renewed. Sometimes a brake drum is oversize or undersize and the brake lining for that drum must be adjusted to meet these abnormal conditions. These irregularities in the brake drum may exist at the time of the original assembly, although the brake drum is supposed to be perfect and never used, or they may exist of course, after usage, and when the brakes are being adjusted or renewed, inasmuch as the brake drum may be worn away somewhat.

In Fig. 1 there is shown a wheel 1, in the form of a rear wheel for automotive vehicles, and in the hub of this wheel there is placed an arbor 2 upon which the gauging tool 3 is journaled as by means of a suitable bushing 4. The tool 3 has a radially extending part 5 provided with a radially extending slot 6 in which is disposed a block 7. A suitable handle 8 extends through the slot 6 and screw threads into block 7, and with this construction the block may be shifted radially and its position may be determined by a suitable scale on the member 5 and indicia on the block, as shown in Fig. 1.

There is a gauging element 10 journaled in the block and the block carries a set screw 11 for holding the gauging element tightly in any position in which it is placed. One end of the gauging element is designed to provide a handle portion 12, while the other end is the gauging element proper, as shown at 13. The mass of the metal of the portion 13 is disposed eccentrically of the journal of the element 10, but it has an edge 14 disposed on the axial center of the journal of the element 10. It is advantageous to cut away the metal adjacent the edge 14, as illustrated in Fig. 6. Accordingly, it will be seen that as the element 10 is rotated in its journal, the edge 14 remains constant.

For the purpose of gauging a drum for an internal expanding brake, the element 10 is disposed in the position shown by the full lines in Fig. 6, and also as shown in Fig. 1, whereupon it is clamped in this position by the set screw 11, and then the tool may be disposed in position illustrated in Fig. 1. The tool may now be rotated on the arbor and all surfaces of the drum accurately gauged, and of course, the block 7 will be tightened in the proper position. Thus the exact size of the given drum is ascertained.

The next step is to gauge the brake lining to fit this drum. To do this the element 10 is rotated through 180° and then held by the set screw 11. This position is shown by the dotted lines in Fig. 6, and also shown in Fig. 2. The tool is now placed upon the axle spindle 15 by the use of a suitable bushing 16, and of course, the gauge line 14 represents exactly the position of the interior surfac of the brake drum. By the use of suitable gauge 17, which represents the desired clearance, the brake lining is very accurately adjusted throughout its entire circumference, and in doing so the tool is rotated upon the axle shaft. Of course, both the brakes of the rear wheels and the front wheels of a vehicle can be adjusted in this manner. In this regard, the structure shown in Fig. 2 may apply equally well to the rear wheel where the part numbered 15 is the axle shaft, or on the front wheel where it is a steering spindle. For gauging the brake drum on front wheels, a suitable arbor 20 may be provided, as shown in Fig. 7, and secured in the hub of the front wheel 21, and the tool 3 is mounted upon the arbor 20.

For the purpose of convenience, the drawings show only an internal expanding brake, but of course, the tool is useful for the contacting type of brake, although it would be merely a repetition of drawings to show this construction. In the case of a contacting type of brake, the gauge element 10 would take the position as shown in Figs. 2 and 3 for gauging the exterior surface of the drum while the gauge element would take the position as shown in Fig. 1 for gauging the brake lining. In other words, the matter is just reversed and, of course, the present invention covers this mere reversing operation.

We claim:

A gauge device for the brakes of an automotive vehicle, comprising in combination, a body member adapted to be journaled upon a wheel axis, said body member having a radially extending portion provided with an elongated, radially extending slot, a holding device carried by said radially extending portion, a handle for the holding device screw threaded into the holding device, the holding device and handle being arranged to be clamped toward each other, with the said radially extending portion interposed to hold said device in a radially adjusted position, a gauging element journaled in the holding device having a part projecting axially and provided with a gauging edge located along its axis, said gauging element having another part projecting oppositely from the first and affording a handle, and means for holding the journaled gauging element with its gauging edge positioned inwardly or outwardly.

In testimony whereof we affix our signatures.

ALVIN L. MILLER.
RUSSELL H. MILLER.